Figure 1:
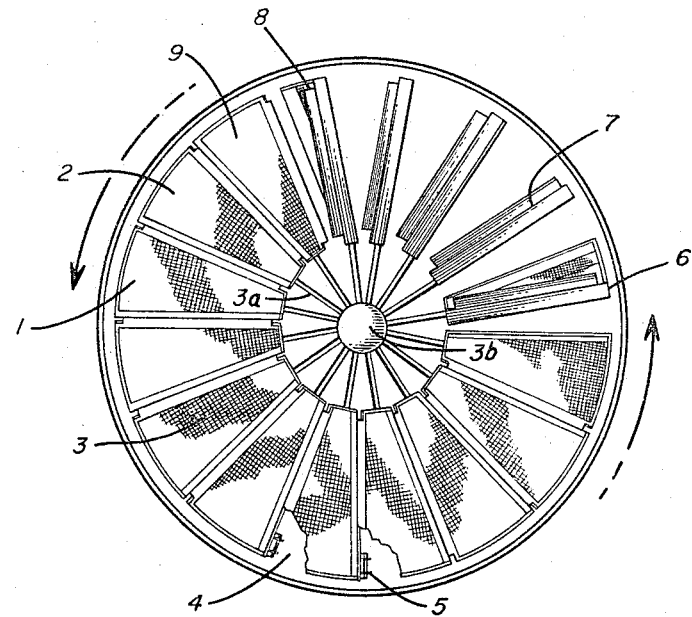

June 27, 1967  G. L. LYLE, JR., ET AL  3,327,860
TILTING PAN FILTER DRAIN VALVE

Filed Sept. 15, 1964  2 Sheets-Sheet 1

INVENTORS
GEORGE LEWIS LYLE, Jr.
RAYMOND COMMER JOHNSTON
BY
ATTORNEY

June 27, 1967   G. L. LYLE, JR., ET AL   3,327,860
TILTING PAN FILTER DRAIN VALVE Filed Sept. 15, 1964   2 Sheets-Sheet 2

INVENTORS
GEORGE LEWIS LYLE, Jr.
RAYMOND COMMER JOHNSTON
BY
*Harry H. Kline*
ATTORNEY

United States Patent Office 3,327,860
Patented June 27, 1967

3,327,860
TILTING PAN FILTER DRAIN VALVE
George Lewis Lyle, Jr., Lakeland, and Raymond Commer Johnston, Bradley, Fla., assignors to American Cyanamid Company, Stamford, Conn., a corporation of Maine
Filed Sept. 15, 1964, Ser. No. 396,486
2 Claims. (Cl. 210—328)

The present invention relates to an improved tilting pan filter. More particularly, it relates to the insertion of an appropriate opening therein to effect substantial and complete elimination of liquids therefrom.

In practice, tilting pan filters function to accomplish the separation of solids from a liquid slurry. Each filter comprises a tray, equipped with a screen positioned approximately midway in the pan. This screen spans the entire pan in its horizontal position. Separation of solids from a liquid slurry is accomplished by trapping the solids on the screen. When vacuum is applied to the pan, liquid is extracted therefrom. Such liquid is normally a waste product and is eliminated. Solids trapped on the screen are collected by terminating the vacuum and causing the pan to tilt to a vertical position to recover solids.

To remove residual solids completely from the pan, the filter is washed with water. In normal operation, wash water inevitably remains in the bottom of the filter. When new feed is introduced into the pan filter, residual water along with liquid to be extracted from the newly introduced feed is then eliminated upon the application of vacuum.

In operations requiring the recovery of liquids rather than solids, total liquid removal becomes a troublesome problem. This is because all residual water is not and cannot be removed from the pan in its vertical position. For instance, in the separation of solids from crude phosphoric acid which is a liquid slurry, it is essential that all residual water be removed prior to the introduction of new slurry feed. This is necessary because residual water places a burden on the operation performed subsequently which involves the elimination of large percentages of water to concentrate the economically important phosphoric acid. Utilizing a tilting pan filter presently known in the art does not solve this initial dilution problem.

It is, therefore, a principal object of the invention to provide a tilting pan filter equipped for substantial and complete elimination of all liquid prior to the introduction of additional feed material to be treated. It is a further object of the invention to provide a suitable opening and valve means in a tilting pan filter to accomplish the elimination of all liquids present in a pan filter. These and other objects will become apparent from a consideration of the following description.

It has been found that a tilting pan filter can be markedly improved by providing for a drain opening in each of the pan filters. This is accomplished by providing for the drain opening located at the bottom-most portion of the pan when tilted and positioned farthest from a vacuum header.

In the tilting pan filter apparatus, a pan is directly linked through a vacuum line attached to a vacuum header. As feed is introduced, the pan rotates slowly in a counter-clockwise direction while maintaining a vacuum on the pan. As stated above, each of the pans contains a screen upon which solids are deposited and liquids percolating to the bottom of the pan are eliminated through the vacuum line.

As the pan rotates, suitable means well known in the art are provided for tilting the same so as to eliminate the solids content. To remove all residual solids, water is applied to the screen which is washed. Prior to the tilting of the pan, vacuum is terminated so that the solids can fall freely by gravity. Also, wash water theoretically is eliminated from the pan by gravity. However, a portion of the liquid remains and, as the pan rotates, it flattens horizontally so as to receive additional new feed material for processing. In the absence of means for eliminating all the liquid introduced in the feed material, for instance, in the phosphoric acid slurry, the new feed so introduced is diluted with residual liquid from a preceding step. This is wholly uneconomical and places a considerable burden on evaporators during the subsequent concentration of the acid.

To eliminate all the wash water in the pan while it is tilted, there is provided a drain assembly of the present invention. The drain is either closed or opened by means of an off-centered hinged gate valve. For instance, when introducing phosphoric acid slurry to be treated into the pan in its horizontal position, vcauum in the acid production portion of the cycle holds the gate valve closed and sealed. However, when the pan is in its vertical position during the water rinse portion of the cycle, vacuum is released and gravity opens the gate valve. All the rinse water flows through the gate to a suitable collector and is eliminated.

In order to further clarify the invention, one embodiment thereof is shown in the accompanying drawings and will be described in detail in conjunction with said drawings.

Figure 2:
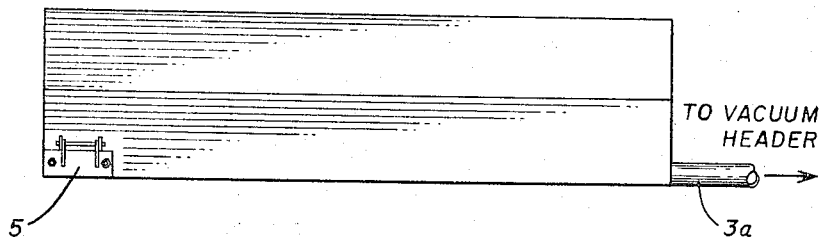
Figure 3:
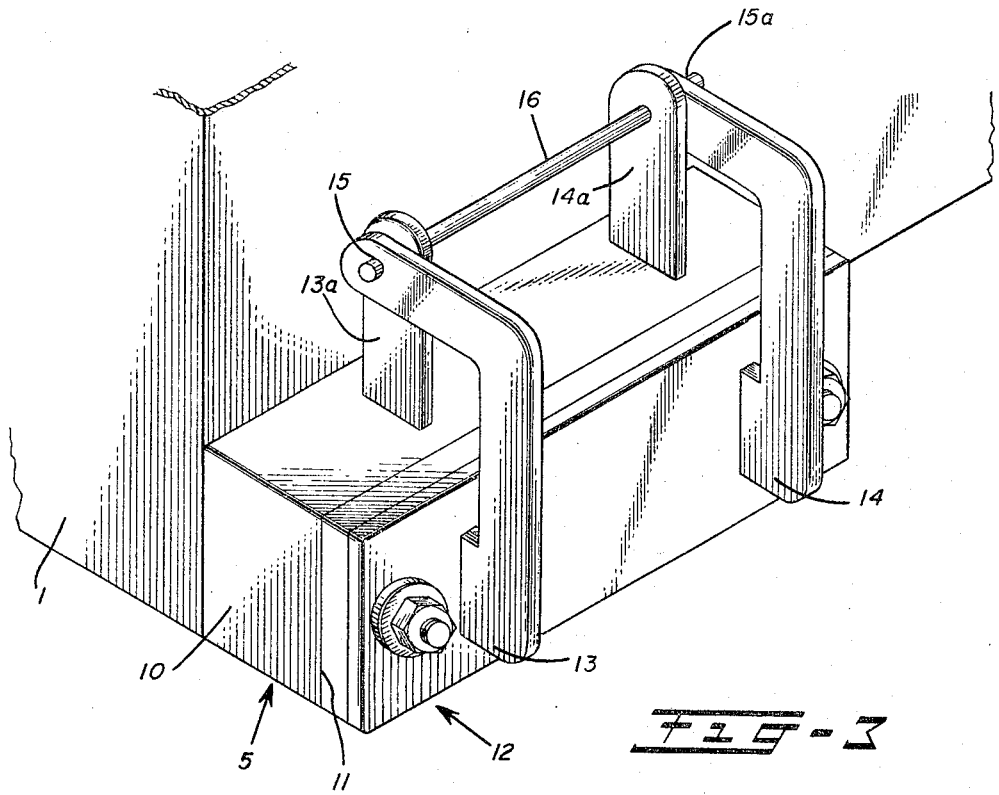
Figure 4:
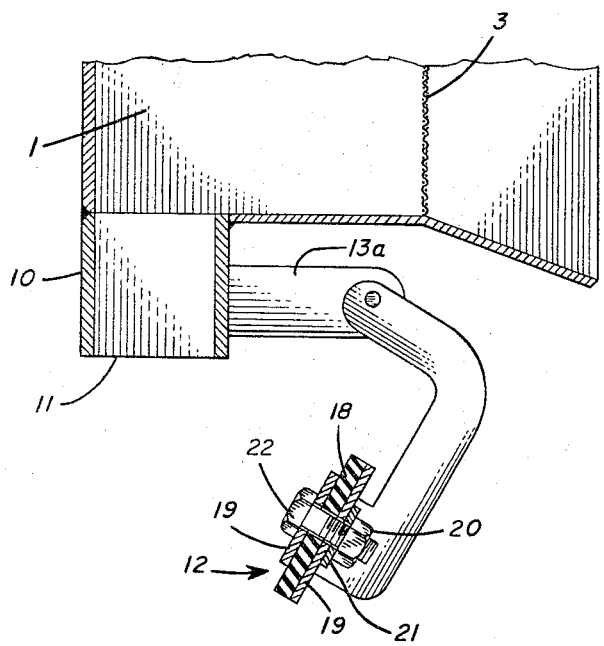

In the drawings:

FIG. 1 is a plan view of the tilting pan filter, FIG. 2 is a side view of the pan, FIG. 3 is a partial isometric view of the drain when the pan is viewed in its horizontal position and FIG. 4 is a cross section through the center of the drain taken when the pan is fully vertical or tilted.

In FIG. 1, feed material is introduced into the pan at 1. The pan rotates in a counter-clockwise direction as indicated and a second pan 2 moves into the position of the first pan wherein additional feed material is introduced into that pan. The improved apparatus, therefore, constitutes a plurality of pan filters. In each of the pans there is located midway between the bottom and top thereof a filter 3 and a vacuum line 3a connected directely to a vacuum header 3b positioned on the inner periphery of the pan. In the cutaway as indicated at 4 there is shown the positioning of the drain 5 at the outer periphery of the pan. As the pan rotates, vacuum is supplied and such vacuum is continued until the pan cmomences to tilt as indicated at 6 by roller means (not shown). Vacuum is then terminated and the solids trapped in the pan are eliminated. Water washing (not shown) commences to clean the filter. When the filter pan is in its vertical position at 7, the drain is completely open. All liquid is eliminated through the drain and as the pan continues in its rotational path, it commences to flatten at 8 by roller means, not shown. The drain 5 closes completely at 9 prior to the introduction of new feed material.

In FIG. 2, a closed drain 5 of the present invention relative to the positioning of vacuum line 3a is shown.

FIG. 3 illustrates an isometric view of drain 5 in a closed position. The drain comprises a hollow protrusion 10 extending from pan 1 having an annular opening at 11. The protrusion's opening is closed by a hinged gate valve 12. As shown, the valve 12 is unitarily attached to arms 13 and 14. The latter are connected to brackets 13a and 14a in off-set positions, indicated at 15 and 15a by means of connecting rod 16. The brackets are secured to the protrusion 10.

FIG. 4 illustrates a section through the center of the valve 12 taken when the pan is fully tilted. There is shown a filter 3 midway positioned in the pan 1 and the protrusion 10 which houses the gate valve 12. The latter comprises an outer or backup plate 17 upon which rubber elastomer 18 rests and fixed in place by an inner plate 19. The assembly is fastened and secured by means of bolt 20, washer 21 and nut 22.

The plates in the gate valve are fabricated from stainless steel and the elastomer packing material is either natural or synthetic rubber, such as neoprene, buna N, and equivalents thereof. The gate valve is fastened to arms which are mounted in an off-set position to secured brackets perpendicularly attached to the pan protrusion. Thus, the forces of gravity can act upon the gate valve in a tilted or vertical position to open the provided annular space. In a horizontal or flattened position, the hinged valve fully closes or seals the annular opening even without the application of vacuum.

We claim:

1. In a tilting pan filter which comprises in combination a plurality of tilting pan filters in which (a) a screen is positioned approximately midway between the bottom and top of each of said pan filters, (b) a vacuum line attached directly to each pan filter and (c) a vacuum header to which said vacuum line is attached, the improvement which comprises in combination: a drain opening and a hinged, rubber packed gate valve for securing said opening, said drain opening being positioned both at the bottom-most portion of the pan filter at a point most distant from said vacuum header and on but one side of said pan filter, said side being closest to the bottom-most portion of the pan when vertically tilted.

2. The improved tilting pan filter of claim 1 wherein said hinged gate valve comprises natural rubber packing and is mounted in an off-set position whereby gravity freely operates thereon to open the valve fully when in a vertical position but fully secures said drain when the pan is in a horizontal position.

References Cited

UNITED STATES PATENTS

| | | | |
|---|---|---|---|
| 1,292,342 | 1/1919 | McGlaughlin | 210—328 |
| 1,495,825 | 5/1924 | Gunten | 210—313 |
| 1,508,041 | 9/1924 | Winton | 210—328 |
| 2,188,840 | 1/1940 | McCue | 210—328 |
| 3,252,575 | 5/1966 | Jacuzzi | 210—136 |

REUBEN FRIEDMAN, *Primary Examiner.*

F. SPEAR, *Assistant Examiner.*